United States Patent [19]

Hartitz

[11] Patent Number: 5,604,278

[45] Date of Patent: Feb. 18, 1997

[54] CPVC COMPOUNDS AND ARTICLES MADE THEREFROM FOR DESIGN STRESS RATING ABOVE 180° F.

[75] Inventor: Joachim E. Hartitz, Avon Lake, Ohio

[73] Assignee: The B. F. Goodrich Company, Akron, Ohio

[21] Appl. No.: 603,572

[22] Filed: Feb. 20, 1996

Related U.S. Application Data

[63] Continuation of Ser. No. 314,573, Sep. 28, 1994, abandoned, which is a continuation of Ser. No. 995,723, Dec. 23, 1992, abandoned.

[51] Int. Cl.$^6$ ........................................................ C08K 5/04
[52] U.S. Cl. ............................ 524/399; 524/414; 524/418
[58] Field of Search ....................................... 524/394, 399, 524/414, 418; 525/80, 81, 82, 85

[56] References Cited

U.S. PATENT DOCUMENTS

| | | | |
|---|---|---|---|
| 2,996,489 | 8/1961 | Dannis et al. | 260/92.8 |
| 3,100,762 | 8/1963 | Shockney | 260/92.8 |
| 3,284,425 | 11/1966 | Schroder et al. | 260/89.5 |
| 3,299,182 | 1/1967 | Jennings et al. | 260/897 |
| 3,334,156 | 8/1967 | Calentine et al. | 260/884 |
| 3,453,347 | 7/1969 | Dreyfuss et al. | 260/897 |
| 3,856,891 | 12/1974 | West et al. | 260/897 |
| 3,940,456 | 2/1976 | Frey et al. | 260/897 |
| 4,076,920 | 2/1978 | Mikofalvy et al. | 526/74 |
| 4,213,891 | 7/1980 | Wear . | |
| 4,246,374 | 1/1981 | Kopchik | 525/329 |
| 4,280,940 | 7/1981 | Klug et al. | 260/23 XA |
| 4,584,349 | 4/1986 | Lehr | 525/227 |
| 4,710,533 | 12/1987 | Neuman | 524/394 |
| 4,847,331 | 7/1989 | Lehr | 525/227 |
| 4,983,687 | 1/1991 | Lawson et al. | 525/356 |
| 5,194,471 | 3/1993 | Hartitz | 524/180 |

FOREIGN PATENT DOCUMENTS

| | | |
|---|---|---|
| 626534 | 8/1961 | Canada . |
| 0603753 | 6/1994 | European Pat. Off. . |
| 0612602 | 8/1994 | European Pat. Off. . |
| 1235403 | 6/1971 | United Kingdom . |

OTHER PUBLICATIONS

Kirk–Othmer, Encyclopedia of Chemical Technology, Third Edition, vol. 23, "Thyroid and Antithyroid Preparations to Vinyl Polymers", pp. 914–915.
ASTM Designation: D2444–93, "Standard Test Method for Determination of the Impact Resistance of Thermoplastic Pipe and Fittings by Means of a Tup (Falling Weight)", pp. 130–136.
ASTM Designation: D1598–86, "Standard Test Method for Time–to–Failure of Plastic Pipe Under Constant Internal Pressure", pp. 29–31.
ASTM Designation: D1784–92, "Standard Specification for Rigid Poly(Vinyl Chloride) (PVC) Compounds and Chlorinated Poly(Vinyl Chloride) (CPVC) Compounds", pp. 46–49.
ASTM Designation: D256–93a, "Standard Test Methods for Determining the Pendulum Impact Resistance of Notched Specimens of Plastics", pp. 1–18.
ASTM Designation: D638–91, "Standard Test Method for Tensile Properties of Plastics", pp. 52–64.
ASTM Designation: D648–82, "Standard Test Method for Deflection Temperature of Plastics Under Flexural Load", pp. 69–73.
ASTM Designation: D3846–93, "Standard Specification for Chlorinated Poly(Vinyl Chloride) (CPVC) Plastic Hot– and Cold–Water Distribution Systems", pp. 312–322.
ASTM Designation: D2846–88, "Standard Specification for Chlorinated Poly(Vinyl Chloride) (CPVC) Plastic Hot– and Cold–Water Distribution Systems", pp. 325–332.
ASTM Designation: F441–93, "Standard Specification for Chlorinated Poly(Vinyl Chloride) (CPVC) Plastic Pipe, Schedules 40 and 80", pp. 762–767.
ASTM Designation: D1243–79, "Standard Test Method for Dilute Solution Viscosity of Vinyl Chloride Polymers", pp. 276–278.
ASTM Designatoin: D792–91, "Standard Test Methods for Density and Specific Gravity (Relative Density) of Plastics by Displacement", pp. 174–177.
Journal of Polymer Science, vol. 12, 1974, "Processability Characteristics of Chlorinated Poly(vinyl Chloride)", M. Krishnan et al., pp. 255–264.
Journal of Polymer Science, No. 33, 1971, "Rheological Studies of Chlorinated Poly(vinyl Chloride)", M. Krishnan et al., pp. 171–180.
Journal of Polymer Science, vol. 9, 1971, "Thermal Decomposition of Poly(vinyl Chloride) and Chlorinated Poly(vinyl Chloride). II. Organic Analysis", S. A. Liebman et al., pp. 1921–1935.
Plastic Pipe Institute, Technical Report, "Recommended Method for Obtaining Hydrostatic Design Basis for Thermoplastic Pipe", Oct. 7, 1968.
Die Angewandte Makromolekulare Chemie 3, 1968, Nr. 46, Viktor Heidingsfeld et al,. "Properties of Chlorinated Polyvinyl Chloride", pp. 141–148.
Plastics Compounding 1994/95 Redbook, "Processing Aids for PVC", p. 37.
J. Polymer Science, Part A–1, vol. 9, 1921–1935 (1971) "Thermal Decomposition of Poly(vinyl Chloride) and Chlorinated Poly(vinyl Chloride)", II. Organic Analysis.

Primary Examiner—Christopher Raimund

[57] ABSTRACT

CPVC compounds intended for low shear extrusion, for example of piping, and articles such as piping derived therefrom are disclosed. The compounds comprise CPVC having 69% to 74% by weight chlorine and preferably 65% to about 69% chlorine; an acrylic impact modifier and a first chlorinated polyethylene containing from about 32% to about 37% chlorine by weight and a Mooney viscosity from 25 to 45, and a second CPE containing from about 36 to about 42% chlorine and a Mooney viscosity of from 60 to about 95. Compression molded plaques derived from the powder composition exhibit a good balance of tensile strength, tensile modulus, izod impact strength, HDT and dynamic thermal stability specified herein. A pipe extruded directly from said composition in powder form under ASTM-D2846 exhibits a long term hydrostatic design strength of at least 500 psi at 200° F. The invention is useful, for example, for industrial use applications such as steam condensate lines.

11 Claims, No Drawings ns under ASTM-D 1784.

CPVC COMPOUNDS AND ARTICLES MADE THEREFROM FOR DESIGN STRESS RATING ABOVE 180° F.

This is a continuation of application Ser. No. 08/314,573, filed Sep. 28, 1994, now abandoned, which is a continuation of application Ser. No. 07/995,723, filed Dec. 23, 1992, now abandoned.

FIELD OF THE INVENTION

The present invention relates to improved thermoplastic extrusions for piping systems exhibiting a combination of properties. In particular, compounds intended for use in extruding pressure piping derived from post-chlorinated polyvinyl chloride are disclosed which exhibit novel properties. The properties pertain to a particular balance of tensile strength, heat deflection temperature, ductility and stress rupture properties for long term hydrostatic stress ratings. As standard extruded pipe, the invention most preferred embodiments meet higher cell classifications under ASTM-D 1784.

BACKGROUND OF THE INVENTION

If properly processed, post chlorinated polyvinyl chloride (CPVC) develops useful physical properties in addition to the inherent higher heat deflection temperature (HDT) compared with polyvinyl chloride. CPVC is a starting material for thermoplastic compounds for hot water pipes, and particularly pressure pipes, waste gas pipes, ducts, storage tanks, and other construction and industrial materials among Other uses. The aim of the invention pertains to CPVC compounds which have unique combination of preferred properties: a notched izod impact strength of at least about 1.2 ft·lbf per inch notch (64 J/m of notch), a tensile strength of at least about 7,000 psi (48.25 MPa), a modulus of elasticity of at least about 360,000 psi (2,481 MPa), and an unannealed heat deflection temperature (HDT) under a 264 psi (1.82 Mpa) load of at least 110° C.. When formed into an extruded pipe, the compounds have good drop impact and exhibit a long term hydrostatic design strength of at least 750 psi at 200° F.

The practical limits for processing CPVC conventionally, are primarily determined by the chlorine content. Conventional CPVC having 63 to 68% chlorine can be formulated to perform under a hydrostatic design stress at about 80° C., and is generally formulated with impact modifiers and flow enhancing additives among other ingredients to arrive at a balance of processibility and the required physical properties. Additives chosen for processing ease are usually detrimental to development of the best physical properties, due to variation in the extent of fusion occurring in the extrusion melt under mechanical shear forces.

Antagonistic relationships have been observed between the amount of impact modifier and resulting melt flow rate, heat deflection temperature, tensile modulus, dynamic thermal stability, and weatherability. Moreover, flow enhancers or processing aids assist in improved extrusion characteristics but can be detrimental to tensile strength, tensile modulus, ductility, and heat deflection temperature. The present invention pertains to the development of long sought physical properties with CPVC having 69 to 74 weight percent chlorine without endangering the work force nor damaging the processing equipment when being processed. At this chlorine level the processing behavior of CPVC significantly departs from the easier processing types with lower chlorine contents. The problem is not addressed by the simple addition of more stabilizer, or more processing aid. The balance of properties desired herein cannot be achieved in this manner.

For example, it was observed that on processing 69 to 74 percent chlorine CPVC with the use of normal amounts of a diene containing impact modifier resulted in such poor processing stability that the compound began to rapidly degrade within a matter of a few minutes after reaching extrusion conditions. This level of degradation presented a serious health and environmental concern in the processing plant. Thus ABS, MBS MABS, and other conventional impact modifiers containing more than about 10 weight percent polydiene cannot be used in the present invention at amounts exceeding about 2 weight parts per 100 weight parts of CPVC.

It has been found that for pressure pipe, CPE as the sole impact modifier/processing aid at above about 6 weight parts per 100 weight parts (phr) of CPVC having 69–74 % chlorine content fails to meet tensile modulus, izod impact per ASTM-D1784, and long term hydrostatic design strength per ASTMD2846, or F-441. Also a desired ductility range cannot be achieved for the finished pipe.

There are few references in the literature dealing with compounding CPVC for low shear extrusion such as for the manufacture of plastic piping. U.S. Pat. No. 3,453,347 discloses impact strength improved CPVC on addition of amorphous rubbery polymerized alkylene monoepoxides and CPE. The particular oxirane monomers found tO produce a rubbery amorphous polymer contain at least 3 consecutive carbons, for example butene-1-oxide. CPE is present at from 5 to about 10 parts and the polyepoxide is present at from about 0.25 parts to about 2.5 parts per hundred weight parts CPVC. The inherent viscosity of the parent PVC from which the chlorinated PVC is derived has a preferred level of greater than about 0.55. The actual examples were with CPVC resin having 65.7% chlorine. Compounds derived from this resin are wholly inadequate in achieving the properties of the present invention.

It was found that in processing 69–74 % chlorine content CPVC with the use of a moderate amount (8 wt. parts or more) of chlorinated polyethylene, the hydrostatic stress rupture properties are not acceptable. It was also found that the degree of chlorination and Mooney viscosity played a critical role in the development of long term hydrostatic stress rupture properties. When more chlorinated polyethylene was used, the stress rupture properties worsened.

Powder compounds in use today are required for high output extrusion processes. Higher output rates are attained with powder compound and using certain expertly operated, larger extrusion machines, output rates have exceeded 900 lbs./hr. This leads to a narrower processing window and places a higher demand on a powder extrusion compound based on CPVC in terms of processibility. In the short amount of residence time under high temperature and controlled shear, a powder compound must achieve complete fusion and resist decomposition in contact with surface temperatures which could otherwise break-down CPVC in a matter of minutes, rendering the fabricated article unsalable. This problem is particularly acute when handling 69–74% chlorine content CPVC since higher processing temperatures are required than for conventional pipe-grade CPVC.

It is not an answer to the problem of achieving higher design stress ratings by using a CPVC having somewhat lower chlorine content plus the use of a Tg enhancing additive. A high strength blend of CPVC and a styreneacrylonitrile (SAN) copolymer was disclosed for instance in U.S. Pat. No. 4,647,646. The blend exhibits preferably a single homogenous phase wherein the preferred embodiment consists essentially of CPVC having between 60.5% and 64.5% chlorine and styrene-co-acrylonitrile (SAN) containing between 18% and 24% acrylonitrile. The blend exhibits improved tensile strength, however a particularly high tensile strength in the absence of adequate impact resistance is not useful for CPVC pressure pipe such as plumbing pipes and fittings, drain- waste-vent systems, or industrial pressure piping uses. A different combination of properties is required which is much more difficult to achieve. Significant impact modification of this blend would most likely present processing problems, and a loss in HDT and tensile modulus.

An improved melt processable CPVC composition is disclosed in U.S. Pat. No. 4,584,349 ('349) comprising a CPVC polymer having chlorine content of between about 60% and 66% in combination with poly-methylmethacrylate. The blends exhibit a substantially single phase morphology and the glass transition temperature (Tg) of the blends was higher than the Tg for the CPVC and PMMA separately. Tg for amorphous polymers is highly correlated with HDT. In some applications, achieving a HDT higher than CPVC is desirable. Higher Tg and improved melt flow are achieved in '349, however compositions with high HDT and melt flow alone are not entirely acceptable for pressure pipe applications without additional properties, particularly, stress rupture properties, tensile strength, tensile modulus, and impact properties achieved from the direct extrusion from powder.

U.S. Pat. No. 4,710,533 ('533) discloses CPVC blends comprising a combination of a flow enhancing amount of alpha-methyl styrene polymers and/or alpha-methyl styrene-co-acrylonitrile, an impact modifier of ABS or MBS, lead stabilizer(s), acrylic processing aid and lubricant(s). The blends exhibit good thermal stability, impact strength and melt viscosity, however an HDT of no higher than 91.5° C. is achieved. HDT is a critical property for CPVC pressure pipe and a minimum value of 110° C. is required for qualification under cell class 2-3-4-4-8. In addition, unacceptable impact performance and tensile modulus for the compositions of '533would be expected. The further addition of impact modifier might improve somewhat the impact strength but would not correct the deficiency in HDT, and would likely lower HDT in addition to decreasing processibility.

Thus, processing of higher chlorine content CPVC presents new problems and attempts to balance all of the desired properties particularly for powder extrusion processing are met with sacrifices in at least one property such as HDT or tensile strength when pursuing improvements in another property. There is considerable art and less science demonstrated both for formulating a composition and in processing that composition to develop all the required properties for improved higher temperature uses for CPVC pipe compounds.

Applications for industrial uses such as steam condensate lines have heretofore been beyond the capabilities of conventional CPVC pipe under these tolerance levels. Accordingly, it would be desirable to obtain a CPVC composition which in the fused state has an HDT of at least 240° F. (115° C.) and approaches or meets the requirements of cell class 2-3-4-4-8 or higher, and it would be desirable to provide a pipe therefrom exhibiting a minimum 200° F. (93° C.) hydrostatic design stress of at least 375 psi (2.58 MPa) or higher per ASTM-D2837, while maintaining adequate ductility. Such a composition and article derived therefrom which exhibits this desired combination of properties has not been heretofore disclosed and represents a long felt need in the art pertaining to CPVC pressure pipe components for higher use temperature service, such as the a forementioned industrial piping systems especially in contact with materials such as steam. With regard to this balance of properties it would be preferable, moreover a practical necessity, for achieving this combination in an extruded or molded article directly from a powder compound. The compound must also exhibit adequate dynamic thermal stability for use in commercial extrusion and injection molding processes.

SUMMARY OF THE INVENTION

It is therefore one aspect of the present invention to provide a thermoplastic composition preferably in powder form, and comprising a specified major proportion of CPVC having 69–74% chlorine, an acrylic polymeric impact modifier in a specified amount, a specified amount of a first chlorinated polyolefin containing from about 32 to 37% chlorine, and a mooney ML 1 +4 viscosity of from about 25 to 45, and a second chlorinated polyolefin containing from about 36 to about 42% chlorine, a mooney ML 1+4 viscosity of from about 60 to 100. Along with the above are properly included effective amounts of lubricant and stabilizer which will be detailed below.

In another aspect, an extruded pipe is made directly from the powder compound and has a combination of properties enabling higher use temperature.

It is a specific aspect of the present invention to provide a compound intended for use in a low shear extrusion, such as for pipe, preferably in particulate form and comprising 100 weight parts of CPVC containing about 69 to about 74% chlorine, from about 3 to about 7 weight parts (per 100 parts CPVC-phr) of the acrylic polymeric impact modifier, from about 2 to about 4.5 pans by weight of the first chlorinated polyolefin, and from about 1 to about 3.5 weight pans of the second chlorinated polyolefin. The compound, optionally can further comprise up to about 5 phr, preferably up to about 2 phr of a polydiene containing impact modifier.

These aspects are obtained by the preferred compound of the present invention comprising CPVC having from 69–72% chlorine content, from about 3 to 5 phr of the acrylic impact modifier, from about 2 - 4 phr of the first chlorinated polyolefin which is a chlorinated polyethylene, and from about 1.5 to about 2.5 phr of the second chlorinated polyolefin which is chlorinated polyethylene. In addition, about 0.5 to 3 phr of one or more waxy lubricants, from 1 to 3 phr of a tin stabilizer, and from 3 to 8 phr of pigment, preferably titanium dioxide are included. Optional colorants for color shading are generally used including carbon black, and coloring ring pigments.

DETAILED DESCRIPTION OF THE INVENTION

CPVC referred to in this specification means chlorinated polyvinyl chloride having a specified weight percent (wt %) of chlorine between about 69% and about 74%, and preferably between about 69% and 72%. Where the chlorine content is outside of the specified range, CPVC exhibits characteristics which render it unsuitable in the present invention.

There are considerations pertaining to the precursor PVC polymer from which are derived post chlorinated PVC employed in this invention. The molecular weight of PVC as indicated by inherent viscosity measurement per ASTM- D1243 generally should range from about 0.4 to about 1.4 at the extremes. Preferably, the I.V. of precursor PVC employed falls within a range of from about 0.4 to about 1.2 with the most preferred range of 0.7 to about 1.2. In the example below the CPVC employed was derived from a precursor PVC having an I.V. of about 0.9. The preferred polymerization method for preparing said PVC is the aqueous suspension method. This is the predominant method used in the art. A detailed description of the suspension process is beyond the scope of the invention and therefore will not be disclosed. The suspension process for polymerization of PVC is described in *The Encylopedia of PVC*, Marcel Decker, Inc. (1976).

CPVC is known to the art and to the literature and is commercially available. CPVC can be made according to any commercial chlorination process or the like such as by a solution process, a fluidized bed process, a preferred water slurry process, a thermal process, or a liquid chlorine process. Inasmuch as CPVC resins are known to the art as well as to the literature, they will not be discussed in great detail herein. Rather, reference is hereby made to the several CPVC patents set forth in the background art, e.g. U.S. Pat. Nos. 2,996,049 and 3,100,762, with regard to suitable types of CPVC within the range of chlorine content which can be utilized, as well as to methods of preparation and the like. The CPVC resins utilized in the present invention generally have a density of from about 1.58 to about 1.70 grams/cc at 25° C. and a glass transition temperature (Tg) at least 60° C. higher than the glass transition temperature of homopolymer PVC resins, as measured by a differential scanning calorimeter. The preferred CPVC resins have densities in the range of from about 1.60 to about 1.66 grams/cc at 25° C. and a glass transition temperature of at least 144° C.

CPVC may be derived from a PVC copolymer having about 5 parts or less of a comonomer. Where the precursor PVC contains less than about 5 parts total of one or more comonomers per 100 parts of vinyl chloride, this polymer will also be referred to here as CPVC. For example, vinyl chloride can advantageously be prepared in the presence of a chain modifying co-reactant such as a solvent, like THF, an ethylenic unsaturated alkylene such as an alpha olefin or a reactive mercaptan such as 2-mercapto ethanol.

Copolymers also include vinyl chloride copolymerized with esters of acrylic acid wherein the ester portion has from 1 to 12 carbon atoms, for example, methyl acrylate, ethyl acrylate, butyl acrylate, octyl acrylate, cyanoethyl acrylate, and the like; vinyl acetate; esters of methacrylic acid wherein the ester portion has from 1 to 12 carbon atoms, such as methyl methacrylate (MMA), ethyl methacrylate, butyl methacrylate, and the like; acrylonitrile, and methacrylonitrile; styrene derivatives having a total of from 8 to 15 carbon atoms such as alpha-methylstyrene, vinyl toluene, chlorostyrene; vinyl naphthalene; diolefins having a total of from 4 to 8 carbon atoms such as isoprene, and including halogenated olefins such as chlorobutadiene, monoolefins such as ethylene and propylene and having from 2 to 10 carbon atoms, desirably 2 to 4 carbon atoms and preferably 4 carbon atoms, with isobutylene being highly preferred. If comonomers are used preferred comonomers are co-monomers such as MMA, co-polymerizable imides such as N-cyclohexyl maleimide and comonomers known to co-polymerize with vinyl chloride monomer and yield a copolymer having a Tg equal to or higher than homo-PVC. The preferred CPVC is derived from a PVC homopolymer.

In theory, CPVC herein may be blended with or contain generally small amounts of PVC and/or PVC copolymers. The amount of PVC homopolymer or copolymer could range from 1–5 phr but it is preferred to exclude any minor amount of PVC.

It is further contemplated in the present invention that CPVC can be blended with another CPVC polymer. The amount of the other CPVC copolymer can be up to about 100 parts per 100 weight parts of a CPVC homopolymer. Preferably there is no other CPVC polymer present.

Diene containing impact modifiers referred to in this specification are generally referred to as graft copolymers prepared by polymerizing of at least one rigid monomer such as a vinyl aromatic monomer, an acrylic monomer, a vinyl nitrile monomer or a mixture thereof in the presence of a pre-formed rubbery substrate such as a polydiene polymer or a diene copolymer thereof. In particular, widely used copolymers comprise of a rubbery substrate 1,3-diene polymer such as for example polybutadiene or polyisoprene, or a copolymer of a 1,3-diene with of a copolymerizable vinyl or vinylidene monomer such as for example a styrene monomer, an acrylate ester monomer, or a vinyl nitrile monomer, and a rigid graft phase formed from at least one rigid vinylidene or vinyl monomer selected from the group consisting of vinyl aromatic monomers, acrylic monomers, vinyl nitrile monomers and mixtures thereof. A rigid monomer is a hardening monomer and for the purposes of this invention means a polymerizable vinyl or vinylidene monomer when homopolymerized would exhibit a glass transition temperature greater than 20° C.. In the preparation of diene containing impact modifiers either the rubbery substrate or the graft phase may further include minor amounts, usually less than about 10 wt %, of a copolymerizable crosslinking monomer to cross-link either or both polymeric components. The rubbery polymer contains a diene polymer which may also be hydrogenated. The copolymers may be prepared by any of the variety of conventional polymerization processes including emulsion, suspension, sequential emulsion-suspension, sequential bulk and solution polymerization processes.

Typical of the graft copolymer impact modifiers are those generally referred to as ABS resins, which may generally be described as copolymers of styrene and acrylonitrile on butadiene containing rubber. Other copolymers include methylmethacrylate-styrene-acrylonitrile grafts on polybutadiene or styrene-butadiene rubber (MABS resins), graft copolymers of methylmethacrylate and, optionally, styrene or polybutadiene or styrenebutadiene rubber (MBS resins) and the like. Commercial versions include various Blendex® grades from GE Plastics, Inc. and Paraloid® grades from Rohm and Haas, Inc. Optional impact modifier containing more than about 10 percent diene is preferably present at up to about 2 phr and is most preferably absent.

The postchlorinated polyethylene (CPE) for use in the blends of this invention is a rubbery material resulting from the chlorination of a polyethylene having a substantially linear structure, a density (ASTM-D1505-57T) of from about 91 to about 0.98 gram/cc. at 25° C., a melting point usually in the range of from about 100° C. to 130° C.; and a melt index (according to ASTM-D1238-57T) in the range above about 0.05, more preferably in the range from about 0.05 to about 20. A good method of preparing such a CPE material is more fully described in U.S. Pat. No. 3,299,182. Suitable embodiments are commercially available from Dow Chemical, Inc.

The present invention employs two different CPE polymers. The first CPE generally contains from about 32% to about 37% by weight chlorine, and most preferably from about 34% to about 36% chlorine. The first CPE exhibits a Mooney viscosity (ML 1+4) at 140° C. of from 25 to 45. The amount of the first CPE ranges from about 1 phr to about 5 phr, preferably from about 1.5 phr to about 4 phr, and most preferably between 1.5 and 3 phr. The second CPE contains from about 36% to about 42% chlorine, preferably from about 38% to about 41% chlorine. The second CPE exhibits a Mooney viscosity (ML 1 +4) at 120° C. of from about 60 to about 95, preferably from 70 to about 95 and most preferably from 75 to 90. Commercial embodiments of CPE are sold under the TYRIN® trademark of Dow Chemical.

At least one polyacrylate impact modifier is included in the present invention. Exemplary polyacrylates include ($C_4$ to $C_{12}$) acrylate homo, or copolymers, second stage graft-copolymerized with methyl methacrylate, polybutyl acrylate jointly graft-copolymerized with methyl methacrylate and styrene, poly(ethylhexyl acrylate-co-butyl acrylate) graft polymerized with styrene,and/or acrylonitrile and/or methylmethacrylate; polybutyl acrylate graft polymerized with acrylonitrile and styrene (Blendex®975, 977, or 979-Trademark of GE Plastics, Inc.). Other commercial embodiments are available from Rohm and Haas, Inc. and include for example KM®-323B, KM®-330, Trademarks of Rohm and Haas, Inc.

It is expected that other components may be advantageously included in the compounds of the present invention. These include, for example, lubricants, stabilizers, impact modifiers, tinting colorants, blueing agents, pigments, Tg enhancing additive(s) and processing aids all of which serve various purposes known in the PVC compounding art.

Exemplary lubricants are polyglycerols of di- and tri-oleates, polyethylene, oxidized polyethylene, and high molecular weight paraffin waxes. Preferred lubricants are Fischer-Tropsch wax and Oxidized polyethylene. Lubricants employed at levels generally ranging from about 0.25 parts to about 3 parts, and preferably from about 0.25 part to about 1.5 parts each. Specific commercial sources are available by reference to *Chemical Week - Buyers Guide*.

Exemplary heat stabilizing ingredients employable herewith include phosphate stabilizers like disodium phosphate, maleimides, sulfer compounds and alkyltin compounds. Tin compounds include methyltin, octyltin, mixed metal alkyltins, dialkyl tin di-carboxylates, methyltin mercaptides, butyltin mercaptides, dialkyl tin bis(alkylmercaptocarboxylate) including di-n-octyltin-S,S'-bis(isooctyl mercaptoacetate), butylthiostannoic acid, and other ester tins. Di-$C_4$-$C_8$ alkyl tin stabilizers such as $C_4$ to $C_8$ alkyl tin Carboxylates are preferred. Use levels generally range from 1 to 5 phr, preferably 2 to 4 phr.

Exemplary processing aids are acrylic polymers such as poly methylacrylate copolymers. Other processing aids are disclosed in *The Plastics and Rubber Institute: International Conference on PVC Processing*, Apr. 26–28 (1983), Paper No. 17. Processing aids are preferably absent.

Exemplary pigments are calcium carbonate, talc, clay and preferably titanium dioxide can be included. Pigment is present if at all generally at from about 0.5 parts to about 20 parts, and preferably from about 3 parts to about 8 phr. The preferred pigment is titanium dioxide.

Optional exemplary Tg enhancing additives include the polyimides such as polyglutarimide, polymaleimide, polytaconimide, and the like. Examples of the preparation of certain polyimides are described by Kopchik, U.S. Pat. No. 4,246,374, and Schroder, et al. U.S. Pat. No. 3,284,425. The polyimides include imide methacrylate copolymers and/or polyaliphatic imide copolymers. The polyimide copolymers are manufactured and sold by the Rohm and Haas Company under the trade names of Paraloid®HT-510, Paraloid®EXL-4151, Paraloid®EXL-4171, Paraloid®EXL-4241 and Paraloid®EXL-4261. Tg enhancing additives are preferably absent.

The powder compounds of the present invention are generally processed in conventional extrusion machinery such as a twin screw extruder employing standard PVC pipe screws. The compositions are processed at melt temperatures which are about 198° C. (390° F.) to about 229° C., (445° F.). The extruder has a hopper through which the material is charged, an intermediate screw processing portion, and a final die through which the material is discharged in the form of an extrudate for large pipe of 2 inches or larger in diameter. It is further advantageous to use low friction sizing such as gauging discs or the Krauss-Maffei sizing sleeves. The multi-screw extruder is widely used for extrusion of pipe. Among the counter rotating screws there are parallel and conical types. Counter rotating types are preferably used to extrude finished articles. They are either gravity or meter fed. In most cases, output rates are directly dependent upon the drive power available. Where available, compounding type extruders, having higher rated drives and gear boxes, are preferred. In the example below a conical twin screw extruder having 55 mm screw diameter at the nozzle end was used. The following machine characteristics are desirable to melt process the composition of the present invention:

Head pressure rating of at least 7500 psi ($5.17 \times 10^7$ Pa).
Extruder drive/gearbox capable of generating high torque at low rpm.
Vacuum venting to remove volatiles, moisture and entrapped air.
A barrel L/D of at least 16/1.
Temperature controllers able to control within ±5° F. or better.
Accurately controllable powder metering screw.

Various changes and modifications may be made in carrying out the present without departing from the spirit and scope thereof. Insofar as these changes are within the purview of the appended claims, they are to be considered as part of the invention.

EXAMPLES

The following standard testing methods referred to here apply to the distinguished properties of the subject invention:

| Property | Standard |
| --- | --- |
| Tensile Strength | ASTM-D638 |
| Modulus | ASTM-D638 |
| Izod Impact | ASTM-D256 |
| HDT under 264 psi | ASTM-D648 |
| Drop Impact Strength | ASTM-D2444 |
| Hydrostatic Strength | ASTM-D1598 |
| Inherent Viscosity | ASTM-D1243 |
| Shore Hardness | ASTM-D530 |
| Specific Gravity | ASTM-D792 |

The composition in the example was also evaluated for processing stability. A primary commercial measure of the relative thermal stability and processability of CPVC compounds is the "dynamic thermal stability" (DTS) test. This test is designed to measure the time-torque relationship at selected temperatures using an instrument such as the Brabender Plasti-corder. The test value generally reported, and used for comparison, is the "DTS time". DTS time is defined as the time at 224° C. required for the instrument torque to fall to its minimum value, with the polymer compound in the melted state, before beginning to increase, presumably due to instability and usually accompanied by autogenous crosslinking. DTS time is dependent not only on polymer properties, but also on temperature, sample size, stabilizers, lubricants, instrument operating conditions, degree of instrument maintenance, and other conditions which are controlled for accurate comparison between different compounds. DTS time at a minimum until degradation should be at least about 15 minutes, preferably 18 minutes and higher. Heat deflection temperature was measured on unannealed samples and under 264 psi load. All parts are parts by weight.

EXAMPLE 1

Four parts by weight of an acrylic modifier were combined with one hundred parts of CPVC containing 70.5% chlorine, 2.4 parts of a tin stabilizer, 2 parts of the first CPE having a Mooney viscosity of 35 tested per ISO 289 and containing 35 weight percent chlorine tested per ISO 1158, 1.5 parts of a second CPE containing 30 percent chlorine per DIN 53474 and a Mooney viscosity per DIN 53523 of 83, 0.5 parts wax lubricant, 1 part of oxidized polyethylene and 5 parts titanium dioxide. The composition was blended on powder mixing equipment, fused on a two roll mill, and compression molded. The sample exhibited an HDT under 264 psi of 119.2° C., tensile strength was 8,095 psi the tensile modulus was 411,700 and the izod impact was 1.2 ft/lbs. A ¾ inch CTS pipe extruded from the composition exhibited a drop impact of 17.4 ft/lbs. The projected 100,000 hr. intercept LTHS at 200° F., based on 180 hours accumulated was 1,113 psi. The powder composition of Example 1 exhibited a Brabender DTS time to degradation of 19.2 minutes at 224° C.

I claim:

1. A compound intended for extrusion of pipe comprising;
   100 parts by weight of a chlorinated polyvinyl chloride (CPVC) having 69–74 % by weight chlorine;
   from about 3 to about 7 parts by weight based on the weight of the CPVC of an acrylic polymeric impact modifier;
   a first chlorinated polyolefin containing from about 32 to 37% chlorine and having a Mooney ML 1+4 viscosity of from about 25 to 45;
   a second chlorinated polyolefin containing from about 36 to about 42% chlorine and having a Mooney ML 1+4 viscosity of from about 60 to 100;
   at least one lubricant; and
   a heat stabilizer,
   wherein the acrylic polymeric impact modifier is selected from the group consisting of:
   (a) an acrylate homo-polymer or co-polymer second stage graft copolymerized with methyl methacrylate;
   (b) polybutyl acrylate jointly graft copolymerized with methyl methacrylate and styrene;
   (c) poly(ethylhexyl acrylate-co-butyl acrylate) graft polymerized with styrene and/or acrylonitrile and/or methylmethacrylate and;
   (d) polybutyl acrylate graft polymerized with acrylonitrile and styrene.

2. The compound of claim 1 wherein said first and said second chlorinated polyolefin are chlorinated polyethylene.

3. The compound of claim 2 wherein said first chlorinated polyethylene is present at from about 2 to about 4.5 parts by weight per 100 weight parts of said CPVC (phr) and said second chlorinated polyethylene is present at from about 1 to about 3.5 phr.

4. The compound of claim 3 wherein said first chlorinated polyethylene is present at from about 2 to about 4 phr and said second chlorinated polyethylene is present at about 1.5 to about 2.5 phr.

5. The compound of claim 1 wherein said acrylic polymeric impact modifier is present at from about 3 to about 5 phr.

6. The compound of claim 1 further comprising up to about 5 phr of a diene containing polymeric impact modifier.

7. The compound of claim 6 further comprising up to about 2 phr of a diene containing polymeric impact modifier.

8. The compound of claim 1 wherein said lubricant is a wax.

9. The compound of claim 8 further comprising oxidized polyethylene.

10. The compound of claim 8 wherein said wax is present at from about 0.5 to about 3.0 phr.

11. The compound of claim 1 wherein said heat stabilizer is a tin stabilizer and is present at from about 1 to about 3 phr.

* * * * *